(12) United States Patent
Giroux et al.

(10) Patent No.: US 7,145,868 B2
(45) Date of Patent: *Dec. 5, 2006

(54) CONGESTION MANAGEMENT IN A MULTI-PORT SHARED MEMORY SWITCH

(75) Inventors: Natalie Giroux, Ottawa (CA); Mustapha Aïssaoui, Nepean (CA)

(73) Assignee: Alcatel Canada Inc., Kanata (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,258

(22) Filed: Nov. 28, 1997

(65) Prior Publication Data

US 2002/0089933 A1     Jul. 11, 2002

(51) Int. Cl.
*H04L 12/56* (2006.01)
*H04L 12/26* (2006.01)

(52) U.S. Cl. .................. 370/229; 370/414; 370/416; 370/418

(58) Field of Classification Search ............. 370/389, 370/391, 392, 395, 398, 412–418, 229–236; 709/213–215

See application file for complete search history.

(56) References Cited

U.S. PATENT DOCUMENTS

| | | | |
|---|---|---|---|
| 5,434,848 A * | 7/1995 | Chimento, Jr. et al. ..... | 370/389 |
| 5,457,687 A | 10/1995 | Newman | |
| 5,541,912 A * | 7/1996 | Choudhury et al. ........ | 370/412 |
| 5,574,720 A | 11/1996 | Lee | |
| 5,600,820 A | 2/1997 | Johnston | |
| 6,009,078 A * | 12/1999 | Sato .......................... | 370/232 |
| 6,034,945 A * | 3/2000 | Hughes et al. ............. | 370/230 |
| 6,055,234 A * | 4/2000 | Aramaki ..................... | 370/389 |
| 6,069,872 A * | 5/2000 | Bonomi et al. ............ | 370/236 |
| 6,097,698 A * | 8/2000 | Yang et al. ................. | 370/231 |
| 6,324,165 B1 * | 11/2001 | Fan et al. ................... | 370/232 |

FOREIGN PATENT DOCUMENTS

WO        WO97/43869         11/1997

OTHER PUBLICATIONS

Hongqing Li, et al.: "Performance of TCP over UBR service in ATM Networks with Per-VC Early Packet Discard Schemes"—Proceedings of the 1996 IEEE Fifteenth Annual International Phoenix Conference on Computers and Communications, Scottsdale, Mar. 27-29, 1996; No. conf. 15, Mar. 27, 1996, pp. 350-357, XP000594803; Institute of Electrical and Electronics Engineers.

(Continued)

*Primary Examiner*—Doris H. To
*Assistant Examiner*—Soon D. Hyun
(74) *Attorney, Agent, or Firm*—Marks & Clerk; S. Mark Budd

(57) ABSTRACT

A method and system for detecting and controlling congestion in a multi-port shared memory switch in a communications network. The proposed congestion management scheme implements a local and a global congestion monitoring process. The local monitoring process monitors the queue depth. When the queue depth for any queue exceeds a queue length threshold a congestion control mechanism is implemented to limit incoming data traffic destined for that queue. Additionally, the global congestion monitoring process monitors the shared memory buffer and if the traffic thereto exceeds a shared memory buffer threshold a congestion control mechanism limits incoming traffic destined for any output queue which has been exceeding a fair share threshold value.

8 Claims, 4 Drawing Sheets

OTHER PUBLICATIONS

XP 000675992 Document entitled "Frame Relay over ATM: traffic control aspects" to P. Castelli; CSELT Technical Reports; vol. XXII, n. 3; Jun. 1994; pp. 307-326.

Allyn Romancw et al; Dynamics of TCP Traffic over ATM Networks.

Abhijit K. Choudhury; A New Buffer Management Scheme for Hierarchical Shared Memory Switches; 1997 IEEE.

* cited by examiner

CONGESTION MANAGEMENT IN A MULTI-PORT SHARED MEMORY SWITCH

FIELD OF THE INVENTION

This invention relates to a data switching node in a communications network and more particularly to a method and system for detecting and controlling congestion in a multi-port, shared memory switch for an ATM network.

BACKGROUND

Asynchronous Transfer Mode (ATM) is being widely used as the preferred transport protocol in broadband integrated services networks. The fixed length ATM cell is particularly suited to multimedia applications including voice, video and data transmission. However, the transparent transport of legacy local area network (LAN) traffic over ATM poses the problem of end-to-end performance. One such performance measure is the achievable throughput, or the amount of data packets successfully transferred between the communicating end-points for the duration of the connection. The other measure of performance is fairness to the users of the service. During periods of congestion when input traffic exceeds the system capacity switches apply a congestion control scheme. The goal of a congestion control scheme is to protect the network while allowing the users to achieve the desired level of performance for their applications. When a congestion control scheme is applied in a switch, it is important to make sure it operates fairly among all of the contending ATM connections. In other words, connections which exceed their fair share of the resources of the switch (buffers and bandwidth) should be targeted first. It is important that connections be allowed to use their fair share of the switch buffers and bandwidth.

An example of an ATM switch congestion control mechanism is called Early Packet Discard (EPD). As soon as a switch reaches a congestion state, the switch starts discarding complete packets, as opposed to individual cells, until the switch is relieved of congestion. EPD prevents buffer overflow and the carriage of partial packets, saving therefore valuable network resources. Partial packets, when transmitted by the network, are discarded at the receiver and retransmission is generally requested. The application of the EPD congestion control mechanism, or any other congestion control mechanism, to an ATM switch with dedicated buffers at the output queues is straightforward. However, many switching architectures use shared memory for a more efficient buffer usage by the contending connections in order to take advantage of the connection varying statistical behavior. In this type of switching architecture, applying EPD or any other congestion control mechanism poses the problem of fairness to the contending connections while keeping the output ports at a high level of utilization. The main difficulty lies in the fact that output port queues share the same memory space (the aggregate buffer pool). Each output port can use instantaneously more than the fraction of the shared memory it would have been allocated if the memory was equally split among the output ports.

SUMMARY OF THE INVENTION

This invention proposes a simple and efficient algorithm for detecting an impending congestion in a shared memory switch, and applying a congestion control mechanism (e.g., EPD) only to the queues which have connections exceeding their fair share of resources and which are thus responsible for the congestion of the switch. The detection of congestion is based on queue depth monitoring. The proposed algorithm is easily implementable in hardware. It can be used in conjunction with any congestion control mechanism. EPD is used in this description as one example to illustrate the performance of the proposed congestion management scheme.

Therefore in accordance with a first aspect of the present invention there is provided a system for managing congestion in a multi-port shared memory switch at a switching node in a communications network, the system comprising:

input ports for receiving data traffic from a plurality of sources;

a shared memory buffer having output queues configured for each of said output ports;

local congestion monitoring means setting a queue length threshold for each output queue to monitor output queue length and to provide queue congestion information when the length of any of said output queues exceeds the said queue length threshold which results in a local congestion detection;

global congestion monitoring means setting threshold to monitor traffic to the shared memory buffer and to provide shared memory congestion information if traffic to said shared memory buffer exceeds the said shared memory buffer threshold which results in a global congestion detection; and congestion control means to receive said output queue congestion information and to limit input traffic destined for any output queue having exceeded said queue threshold and to monitor said shared memory congestion information and to limit input traffic destined to any output queues having exceeded a fair share threshold when said shared memory buffer threshold has been exceeded.

In a preferred embodiment the communications network is an ATM network for transporting ATM cells or packets of ATM cells between end users.

In this embodiment the fair share threshold is determined by finding the product of the buffer size and the buffer threshold and dividing the product by the number of output port queues.

Further, in this embodiment execution of the congestion management algorithm is either triggered by the arrival event of packets or cells, or is a background process running at a predefined configurable frequency.

In accordance with a second aspect of the invention there is provided a method of managing congestion in a multi-port shared memory switch for transporting data traffic through an communications network, said switch having a plurality of input ports, a plurality of output ports and a shared memory buffer having individual output queues configured for each of said output ports. The method according to this aspect comprising:

providing local congestion monitoring means to set a queue length threshold for each output queue, to monitor output queue length and to provide queue congestion information when the length of any of the output queues exceeds the queue length threshold which results in a local congestion detection;

providing global congestion monitoring means to set a shared memory buffer threshold, to monitor traffic to the shared memory buffer and to provide shared memory congestion information if traffic to the shared memory buffer exceeds the shared memory buffer threshold which results in a global congestion detection; and providing congestion control means to receive the output queue congestion information and to limit input traffic destined for any output queue having exceeded the queue threshold and to monitor the shared memory congestion information and to limit input traffic destined to any output queues having exceeded a fair share threshold when the shared memory buffer threshold has been exceeded.

BRIEF DESCRIPTION OF THE DRAWINGS

The invention will now be described in greater detail with reference to the attached drawings wherein.

DETAILED DESCRIPTION OF THE INVENTION

Figure 1:
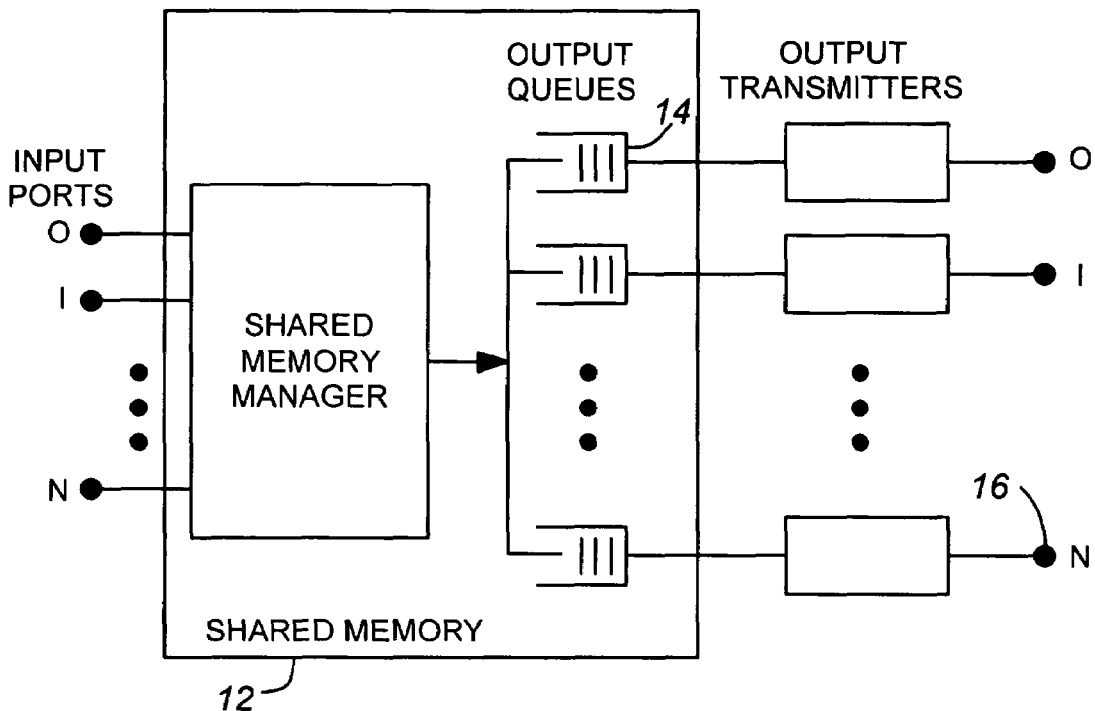
FIG. 1 is a simplified diagram of an output queuing switch with a shared memory architecture.

A simplified diagram of an output queuing switch with a shared memory architecture is shown in FIG. 1. The shared memory 12 is organized into logical queues 14, one for each output port 16. The switch has N output ports and each port has a queue with a maximum depth of Max_Queue_Size. The queue maximum queue depth is a percentage of the size of the shared memory pool, Shared_Memory_Size. Note that Max_Queue_Size is set higher than Shared_Memory_Size/N. i.e., the queue fair share of the cell memory pool, for an efficient usage of the memory resource.

The proposed congestion management scheme identifies two levels of congestion monitoring in a shared multi-port switch: local congestion monitoring and global congestion monitoring. Thus two levels of congestion detection exist. The first one occurs when an individual output port queue reaches its congestion threshold. This level is referred to as Local Congestion. The output queue congestion threshold, Queue_Threshold, is a percentage of the maximum depth of this queue Max_Queue_Size. The second level, referred to as Global Congestion, occurs when the shared buffer reaches its congestion threshold. The shared memory congestion threshold, Global_Threshold, is a percentage of the shared memory size. Note that these two levels of congestion detection are not mutually exclusive. In other words, one or many output ports may reach congestion while the shared memory pool may or may not get congested as a consequence of this. Conversely, when the shared memory pool reaches its congestion threshold, the individual output port queues may or may not have reached their congestion threshold. These congestion states are a result of allowing the output queues to reach a maximum depth higher than their fair share of the shared memory pool.

The two levels of congestion detection associated with the resulting combination of congestion states require an algorithm that will prevent both the individual output port queues and the aggregate buffer from overflowing, while assuring an acceptable level of fairness to all the contending connections. The proposed congestion management algorithm is a simple implementable solution to these requirements.

Figure 3A:
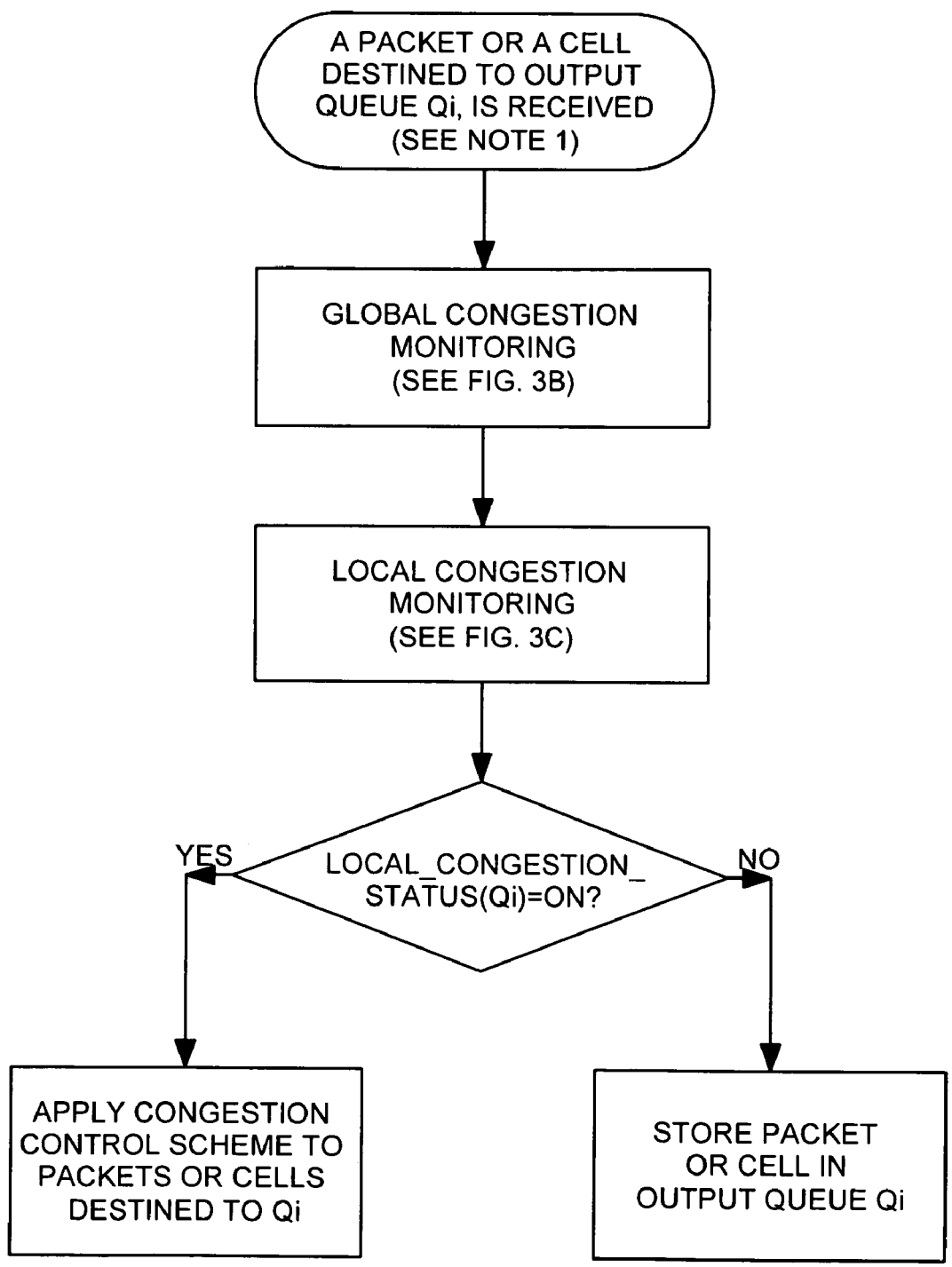
FIG. 3a is a high-level description of the proposed congestion management scheme in flow chart form.
Figure 3B:
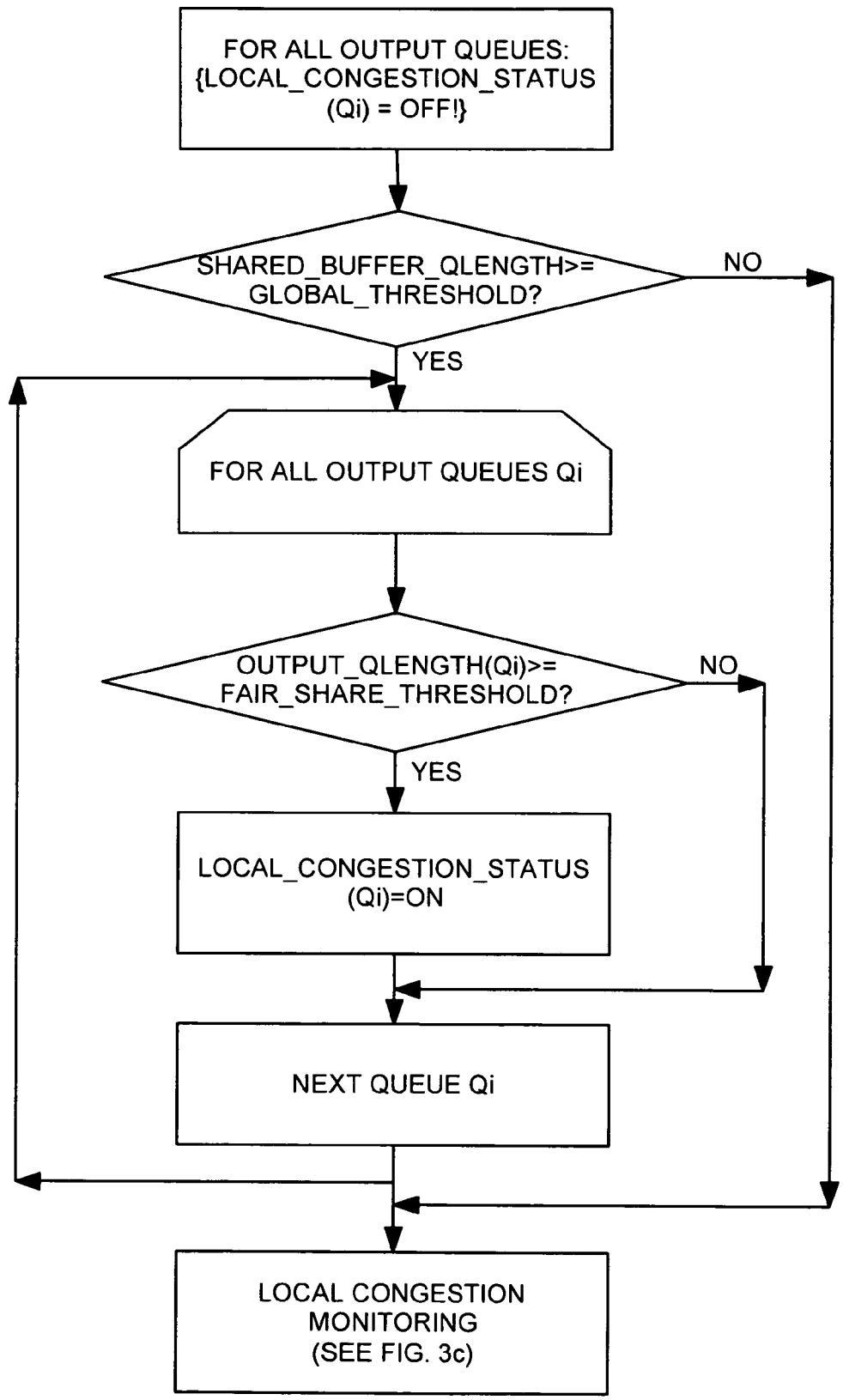
FIG. 3b is a flow chart of the global/congestion monitoring process according to the invention.
Figure 3C:
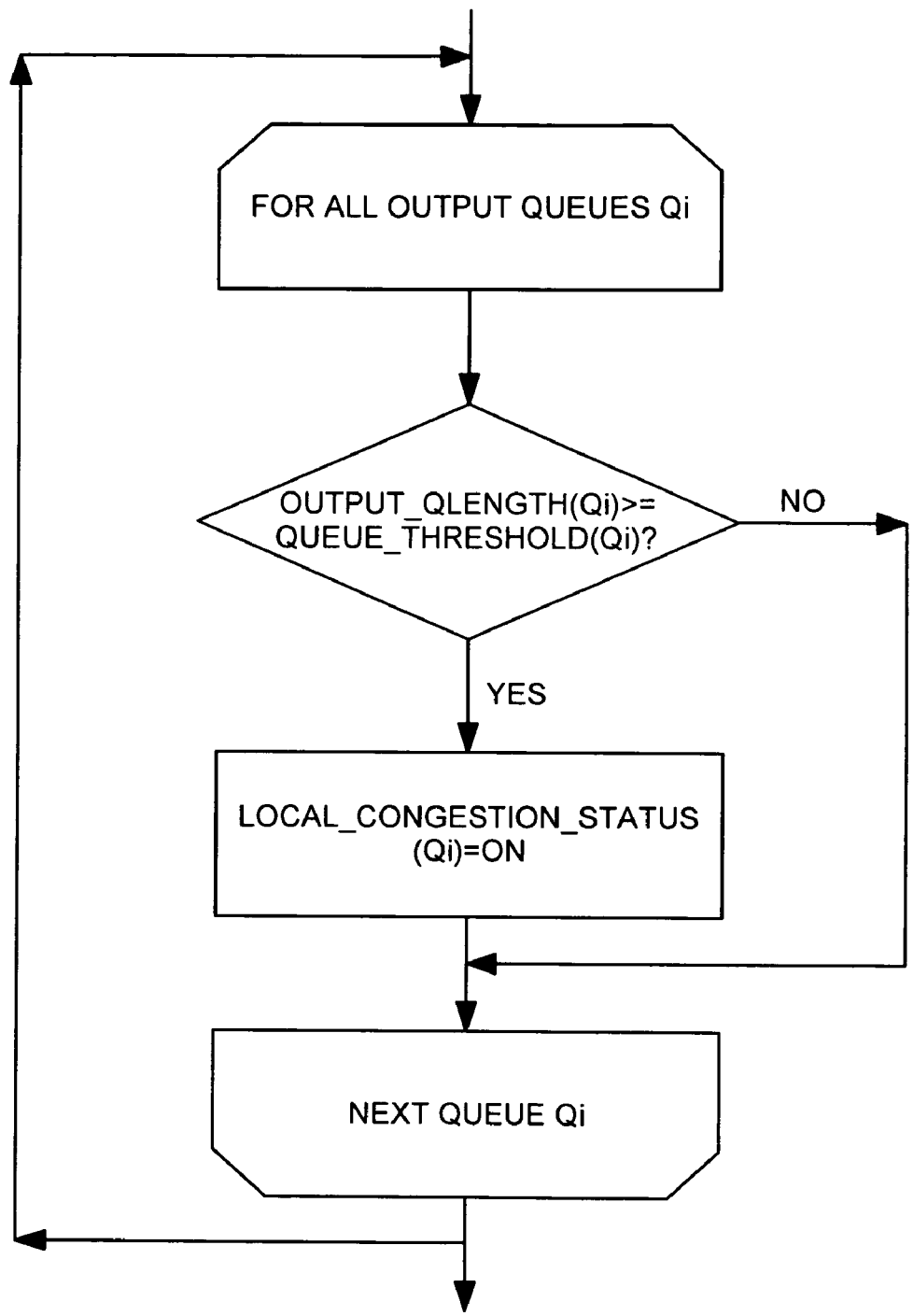
FIG. 3c is a flow chart of the local congestion monitoring process according to the invention.

The following is a high-level description of the proposed congestion management algorithm. When an output queue 14 reaches its congestion threshold, Queue_Threshold, congestion control is applied to the connections destined to this queue only. When the shared buffer reaches its congestion threshold, Global_Threshold, the congestion control mechanism is triggered on the output queues which have exceeded their fair share of the memory pool. An output queue Qi exceeds its fair share if its length, Output_Qlength(Qi), is higher than Fair_Share_Threshold= (Global_Threshold*Shared_Memory_Size)/N). The operation of the congestion management algorithm is described in the following pseudo-code. The flow-chart diagrams are given in FIGS. 3.a to 3.c. Note that the algorithm can run as a background process or can be triggered by cell or packet arrival events.

```
// Initialization.
Fair_Share_Threshold = (Global_Threshold
*Shared_Memory_Size) / N
// At the reception of a new cell or packet destined to
output queue Qi, or at regular time intervals (background
process,) both Global and Local Congestion Monitoring are
performed.
//Global Congestion Monitoring: checks for congestion of
the shared memory buffer.
for all Output Queues
{
    Local_Congestion_Status (Qi) = OFF;
}
if (Shared_Buffer_Qlength >= Global_Threshold)
{
    for all Output Queues
    {
        if (Output_Qlength (Qi) >= Fair_Share_Threshold)
        {
            Local_Congestion_Status (Qi) = ON;
        }
    }
}
// Local Congestion Monitoring: checks for congestion of
the output port queues.
for all Output Queues
{
    if (Output_Qlength (Qi) >= Queue_Threshold (Qi) )
    {
        Local_Congestion_Status (Qi) = ON;
    }
}
```

When the local congestion status flag of a given output queue is set, the congestion control mechanism is applied to the connections destined to this queue.

Figure 2:
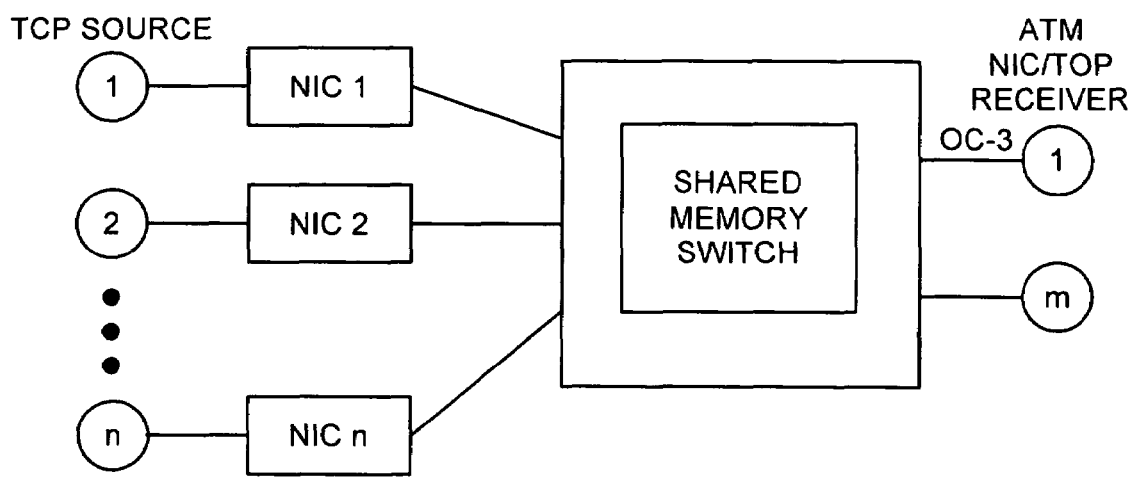
FIG. 2 illustrates a network set-up for a system simulation.

The following is an evaluation of the performance of the proposed congestion management scheme making use of EPD as the congestion control mechanism. The simulation compares its performance to that of the same system when the congestion management scheme is disabled. In this latter case, cells are indiscriminately discarded once the shared memory or the output queues are full. The simulation network set-up is shown in FIG. 2.

The following is a summary of the configuration parameters used for the simulation:

Switch size: 16×8 (M=16, N=8).

Output links: Sonet OC-3c (149.76 Mbps available for ATM payload).

Shared memory size: Shared_Memory_Size=4000 cells.

Output queue maximum queue depth: Max_Queue_Size=2000 cells (50% of shared pool).

Global EPD threshold: Global_Threshold=3600 cells (90% of shared pool).

Output port queue EPD threshold: Queue_Threshold=1800 cells (90% of maximum queue depth).

Type of sources: greedy TCP source. The TCP simulator is an evolution of the REAL TCP simulator from Columbia's Nest simulation package and is based on the 4.3 BSD Tahoe algorithms, released in 1986. This version of TCP is currently the most popular implementation of TCP.

Number of sources: there are 128 TCP sources. Each source is associated with a single ATM virtual connection. Each switch input link multiplexes 8 ATM virtual connections.

Switch loading: two loading scenarios are considered. First, a balanced loading of the switch is simulated. In this case, the virtual connections are evenly distributed among the N output ports of the shared memory switch. For instance, each output port receives 16 virtual connections.

The second scenario performs an unbalanced loading of the switch. Output ports 0 and 1 get 40 connections each, while the remaining 6 ports get 8 connections each.

The two loading scenario constitutes extremes in switch congestion so that the proposed congestion detection algorithm is thoroughly tested.

Number of receivers: there are 8 TCP receivers, or sinks (one on each output port of the switch).

Network propagation delay: 0.1 milliseconds one way (30 Km).

The performance figures used to evaluate the proposed algorithm are defined in the following.

Goodput is defined as the ratio of the achieved throughput to the maximum achievable throughput. Throughput is defined as the rate of good data received by the TCP receiver. Good data refers to the amount of successfully received packets by the TCP receiver. Retransmissions triggered by the TCP stack or duplicate packets received at the receiver are not counted as good data.

The maximum achievable throughput is limited by the bottleneck in the network or at the source. Usually, goodput is expressed as a percentage of the bottleneck link and reflects the efficiency in using the link.

Given a switch with N output ports, the overall goodput is evaluated as follows:

$$Goodput = \frac{\sum_{i=1}^{n}(Good\_Data)_i}{N*T*Line\_Rate*\frac{Pkt\_Size}{53*\lceil Pkt\_Size/48 \rceil}}$$

where N is the number of bottleneck links (N=8 in this case), Good_Data is the total amount in bits of data corresponding to successfully transmitted packets (retransmissions or duplicate packets are not considered), T is the measurement period (simulation time in this case), Pkt_Size is the size of the TCP packet in bytes, and Line_Rate is the maximum transmission rate of the bottleneck link between the two switches. $\lceil x \rceil$ is the smallest integer higher or equal to x.

One of the objectives of a congestion control mechanism is to provide fairness to all users of a network. Fairness ensures that no circuits are arbitrarily discriminated against and no set of circuits is arbitrarily favored, although resources may be allocated to a defined policy. A fairness index expression is used to evaluate the share of the available bandwidth among the users:

$$Fairness\_Index = \frac{\left[\sum_i x_i\right]^2}{n\sum_i x_i^2}$$

where n is the number of connections (or sources) sharing the network resources, and $x_i$ is the ratio of the actual throughput of a connection to the optimal throughput. The optimal throughput is the fair share of the available bandwidth for the considered connection.

The results obtained using the above configuration parameters are shown in Tables 1 through 4 for the goodput figure and the overall fairness. The results when the congestion management (CM) scheme is disabled are also shown for comparison purposes.

TABLE 1

Goodput Figures for the Balanced Load Set-up.

| TCP Packet Size (Bytes) | CM Disabled | CM Enabled |
|---|---|---|
| | Goodput (%) | |
| 512 | 87.36 | 95.10 |
| 1536 | 70.57 | 93.04 |
| 4352 | 66.17 | 92.59 |
| 9180 | 60.47 | 89.92 |

TABLE 2

Overall Fairness for the Balanced Load Set-up.

| TCP Packet Size Bytes) | CM Disabled | CM Enabled |
|---|---|---|
| | Fairness Index (%) | |
| 512 | 0.99 | 99% |
| 1536 | 0.95 | 98% |
| 4352 | 0.90 | 97% |
| 9180 | 0.83 | 97% |

TABLE 3

Goodput Figures for the Unbalanced Load Set-up.

| TCP Packet Size Bytes) | CM Disabled | CM Enabled |
|---|---|---|
| | Goodput (%) | |
| 512 | 87.97 | 94.71 |
| 1536 | 64.09 | 88.55 |
| 4352 | 62.72 | 94.32 |
| 9180 | 63.48 | 93.17 |

TABLE 4

Fairness Figures for the Unbalanced Load Set-up.

| TCP Packet Size Bytes) | CM Disabled | CM Enabled |
|---|---|---|
| | Fairness Index (%) | |
| 512 | 0.98 | 99% |
| 1536 | 0.95 | 97% |

TABLE 4-continued

Fairness Figures for the Unbalanced Load Set-up.

| TCP Packet Size Bytes) | CM Disabled Fairness Index (%) | CM Enabled |
|---|---|---|
| 4352 | 0.90 | 95% |
| 9180 | 0.54 | 93% |

The results show a significant improvement in the performance of the switch when the proposed congestion management algorithm is used in conjunction with EPD. The goodput is improved up to 95% when the congestion management algorithm is enabled. The overall fairness is significantly enhanced and is maintained to a very high level for both a balanced loading and an unbalanced loading of the switch. The proposed algorithm shows a consistent robustness for all TCP packet sizes.

Although a particular embodiment of the invention has been illustrated and described it will be apparent to one skilled in the art that numerous changes can be made to the basic concept. It is to be understood that such changes will fall within the scope of the invention as defined by the appended claims.

We claim:

1. A method of managing congestion of a shared memory organized into a plurality of logical queues, comprising:
   setting a global threshold (GT) as a percentage of the total size of the shared memory (SMS), the global threshold for indicating a global congestion;
   setting a fair share threshold (FSQ) for each logical queue, based on the global threshold, on the total size of the shared memory, and on the total number of logical queues;
   setting a queue threshold (QT) for each logical queue, based on the maximum size (MQS) allocated in the shared memory to each logical queue; and
   declaring a global congestion level for said shared memory, based on the global threshold and on the fair share thresholds.

2. A method as in claim 1, wherein declaring a global congestion level comprises:
   determining if a current size (SBL) of memory currently occupied by all logical queues in the shared memory is greater than the global threshold;
   if the current size of memory currently occupied by all logical queues in the shared memory is greater than the global threshold, comparing the current size (OQL) of each logical queue to the respective fair share threshold;
   setting a local congestion status "on" for all logical queues for which the current size of the logical queue exceeds the fair share threshold of the logical queue; and
   activating a congestion control mechanism for the logical queues to all logical queues whose current size exceeds the fair share threshold of the logical queue, for resolving global congestion.

3. A method as in claim 2, wherein the fair share threshold of each logical queue is less than the respective maximum size allocated to the queue in the shared memory.

4. A method as in claim 3, further comprising declaring a local congestion level for a logical queue, based on the queue threshold of the logical queue.

5. A method as in claim 4, wherein declaring a local congestion level comprises:
   comparing the current size of each said logical queue with the respective queue threshold;
   setting the local congestion status "on" for all logical queues for which the current size of the logical queue exceeds the respective queue threshold; and
   activating a congestion control mechanism for all logical queues whose current size exceeds the respective queue threshold, for resolving local congestion.

6. A method as in claim 1, wherein the fair share threshold for all logical queues is set as $$FSQ = GT*SMS/N,$$

where
   FSQ is the fair share threshold,
   GT is the global threshold,
   SMS is the total size of the shared memory, and
   N is the number of logical queues.

7. A method as in claim 1, wherein the method is initiated upon receipt of a cell destined to an output queue cell.

8. A method as in claim 1, wherein said method is performed as a background process at a predefined configurable frequency.

* * * * *